(12) United States Patent
Yost

(10) Patent No.: US 12,415,620 B2
(45) Date of Patent: Sep. 16, 2025

(54) SYSTEM AND METHOD FOR DIMPLED SPHERICAL STORAGE UNITS

(71) Applicant: Thomas F. Yost, Chesapeake Beach, MD (US)

(72) Inventor: Thomas F. Yost, Chesapeake Beach, MD (US)

(*) Notice: Subject to any disclaimer, the term of this patent is extended or adjusted under 35 U.S.C. 154(b) by 0 days.

(21) Appl. No.: 18/664,116

(22) Filed: May 14, 2024

(65) Prior Publication Data
US 2024/0375794 A1  Nov. 14, 2024

Related U.S. Application Data

(60) Provisional application No. 63/466,327, filed on May 14, 2023.

(51) Int. Cl.
| | |
|---|---|
| *B64G 1/00* | (2006.01) |
| *B64B 1/08* | (2006.01) |
| *B64B 1/30* | (2006.01) |
| *B64G 1/40* | (2006.01) |
| *B64G 1/64* | (2006.01) |
| *B64G 4/00* | (2006.01) |

(52) U.S. Cl.
CPC .............. *B64G 1/005* (2013.01); *B64B 1/08* (2013.01); *B64B 1/30* (2013.01); *B64G 1/008* (2023.08); *B64G 1/40* (2013.01); *B64G 1/6462* (2023.08); *B64G 4/00* (2013.01); *B64G 2004/005* (2013.01)

(58) Field of Classification Search
CPC .......... B64G 1/005; B64G 1/008; B64G 1/40; B64G 1/6462; B64G 4/00; B64G 2004/005; B64B 1/08; B64B 1/30
See application file for complete search history.

(56) References Cited

U.S. PATENT DOCUMENTS

| | | | |
|---|---|---|---|
| 5,143,327 A | 9/1992 | Martin | |
| 5,145,130 A | 9/1992 | Purves | |
| 9,434,485 B1 | 9/2016 | Lehocki | |
| 10,214,303 B1 | 2/2019 | Turner et al. | |
| 2005/0017132 A1 | 1/2005 | Janeke | |
| 2007/0012820 A1 | 1/2007 | Buehler | |
| 2008/0265099 A1 | 10/2008 | Carmarda et al. | |
| 2016/0075454 A1* | 3/2016 | Smith, Jr. .............. | H02K 41/02 244/171.1 |

(Continued)

FOREIGN PATENT DOCUMENTS

| | | | | |
|---|---|---|---|---|
| CN | 108648848 A | * | 10/2018 | ............. B64G 1/408 |
| CN | 114684387 A | | 7/2022 | |

(Continued)

OTHER PUBLICATIONS

Corresponding PCT/US2024/029321. Invitation to Pay Additional Fees (Aug. 13, 2024).

(Continued)

*Primary Examiner* — Valentina Xavier
(74) *Attorney, Agent, or Firm* — Jessica Smith; LOZA & LOZA, LLP

(57) ABSTRACT

A dimpled spherical storage unit is described in the form of a cargo ball. The cargo ball includes a spherical exterior surface and a plurality of dimples in a pattern on the exterior surface. At least a first cover is configured to extend outward from the center of the cargo ball and at least a first thruster is configured to be deployed from the cargo ball.

11 Claims, 6 Drawing Sheets

(56) References Cited

U.S. PATENT DOCUMENTS

2018/0327072 A1  11/2018 Price
2019/0023424 A1  1/2019 Helvajian et al.
2021/0024230 A1  1/2021 Glogowski et al.

FOREIGN PATENT DOCUMENTS

DE    19846327 C1      3/2000
FR    2886271 A1      12/2006
RU    2496688 C2 *  10/2013

OTHER PUBLICATIONS

Corresponding PCT/US2024/029321. International Search Report & Written Opinion (Oct. 30, 2024).
Related PCT/US2024/029328. International Search Report & Written Opinion (May 8, 2025).
Chen. "Propulsion system characterization for the SPHERES formation flight and docking testbed." Diss. Massachusetts Institute of Technology (May 24, 2002). Submitted in Two Parts Due To File Size.
Rodgers. "Concepts and technology development for the autonomous assembly and reconfiguration of modular space systems." Thesis. Mass. Inst. Technology, Dept. Mechanical Engineering (Feb. 2006).

* cited by examiner

SYSTEM AND METHOD FOR DIMPLED SPHERICAL STORAGE UNITS

CROSS REFERENCE TO RELATED APPLICATIONS

The present application claims priority under 35 U.S.C. § 119 to U.S. Provisional Application No. 63/466,327 entitled, "SPACE CARGO DIRIGIBLE AND LAUNCHER," filed May 14, 5023, and hereby expressly incorporated by reference herein.

U.S. patent application Ser. No. 18/663,335 filed May 14, 2024 entitled, "SYSTEM AND METHOD FOR A SUPERCONDUCTIVE, ELECTROMAGNETIC LAUNCHER", by inventor Thomas F. Yost, the entirety of which is incorporated by reference herein.

U.S. patent application Ser. No. 18/663,355, filed May 14, 2024 entitled, "SYSTEM AND METHOD FOR A SPACECRAFT DOCKING STATION," by inventor Thomas F. Yost, the entirety of which is incorporated by reference herein.

U.S. patent application Ser. No. 18/664,170, filed May 14, 2024 entitled, "SYSTEM AND METHOD FOR SMART SPHERICAL CLUSTER VESSELS," by inventor Thomas F. Yost, the entirety of which is incorporated by reference herein.

U.S. patent application Ser. No. 18/663,365, filed May 14, 2024 entitled, "SYSTEM AND METHOD FOR A STRATOSPHERIC AIRCRAFT," by inventor Thomas F. Yost, the entirety of which is incorporated by reference herein.

FIELD

This application relates to systems and methods for a spacecraft and more specifically, to a spherical, dimpled vessel configured to transport cargo to space.

BACKGROUND

Current and future missions to outer space require that a significant amount of goods and materials be taken from our planet into outer space. Even the current space stations require frequent supply missions to sustain the people living there and to provide other materials for the station and for the work that is performed there. Currently almost all movement into outer space is performed using rockets which are made up primarily of the first and second stage with a small payload. The first and second stages have long cylindrical tanks and a rocket engine at one end. With some vehicles, the first stage can be recovered and reused, but the second stage often ends up as space junk. With other vehicles, it all ends up as space junk threatening manned and unmanned spacecraft.

To enjoyably travel and populate other worlds, there should be farms, hotels, towns, power, and plentiful water and food. On Earth, before a building is a building, before an airport is an airport, hundreds of dump trucks, delivery trucks, conveyer belts, dirt, steel, and concrete are needed. In Space, space cargo refers to the heavy lifting to transport into the solar system all of the materials needed to build a city's water & food supplies, infrastructure, shelter, and power plants to bring light & electricity for new worlds. Every city (even on Mars or the Moon) needs building materials, concrete, soil, fertilizer, oxygen, water, drilling equipment, pipes, and reactor parts. Space cargo can be used to provide materials to other worlds and also to send home Helium-3, the magic isotope that will ignite the future of clean Nuclear Fusion. Helium-3 will also provide the energy for the Moon itself, and the future buildout of the Solar System.

In view of the above disadvantages and others described in this specification, improved technologies for reusable space cargo vessels are needed that reduce costs, power, and environmental concerns.

SUMMARY

In one aspect, a cargo ball includes a spherical exterior surface and a plurality of dimples in a pattern on the exterior surface. The cargo ball includes at least a first cover configured to extend outward from the center of the cargo ball and at least a first thruster configured to be deployed from the cargo ball.

In another aspect, a method includes launching a cargo ball toward outer space, the cargo ball having a spherical exterior surface and a plurality of dimples in a pattern on the exterior surface. The method further includes after launching the cargo ball, deploying a thruster by extending the thruster through a cover on a surface of the cargo ball; operating the thruster to maneuver the cargo ball to an intended destination; and retracting the thruster back into the cargo ball.

In one or more of the above aspects, at least one arm is configured to be attached to the thruster such that the arm extends from the cargo ball and the thruster is at the end of the arm.

In one or more of the above aspects, the arm is rotatable through some portion of a circle to allow the thruster to be directed in different directions.

In one or more of the above aspects, four arms extend from the cargo ball in each of four opposite quadrants of the outer surface of the cargo ball.

In one or more of the above aspects, a main engine cover is seamless with the exterior surface when retracted and includes the plurality of dimples, and a main engine is configured to be deployed from the cargo ball to provide thrust to the cargo ball.

In one or more of the above aspects, an outer shell of the cargo ball is made from a thin ferromagnetic material or superconducting material.

In one or more of the above aspects, a thruster is directed in different directions during operating the thruster to maneuver the cargo ball.

In one or more of the above aspects, launching the cargo ball comprises launching the cargo ball with a spin and maneuvering with spin thrust or wherein maneuvering the cargo ball comprises de-spinning the cargo ball.

In one or more of the above aspects, the cargo ball is launched from an upper atmosphere and deploying the thruster comprises deploying the thruster after leaving the upper atmosphere or entering space.

DETAILED DESCRIPTION

The word "exemplary" or "embodiment" is used herein to mean "serving as an example, instance, or illustration." Any implementation or aspect described herein as "exemplary" or as an "embodiment" is not necessarily to be construed as preferred or advantageous over other aspects of the disclosure. Likewise, the term "aspects" does not require that all aspects of the disclosure include the discussed feature, advantage, or mode of operation.

Embodiments will now be described in detail with reference to the accompanying drawings. In the following description, numerous specific details are set forth in order to provide a thorough understanding of the aspects described herein. It will be apparent, however, to one skilled in the art, that these and other aspects may be practiced without some or all of these specific details. In addition, well known steps in a process may be omitted from flow diagrams and descriptions presented herein in order not to obscure the aspects of the disclosure. Similarly, well known components in a device or well-known systems may be omitted from figures and descriptions thereof presented herein in order not to obscure the aspects of the disclosure.

A cargo ball is described that allows for cargo and people to be transported more efficiently and more easily than a multi-stage rocket with a small payload. The cargo ball may be "smart" in that it operates autonomously under computer control, or in that it may be piloted remotely through a radio or optical connection. A cargo ball provides an improved cargo container for space. A cargo ball can transport oxygen, soil, fertilizer, Helium-3 crystals, liquefied Helium-3, propellant, bushes, small trees, water, building materials, etc. and can be outfitted for crew quarters. A cargo ball can transport all of the materials necessary to build communities on other worlds.

Figure 1:
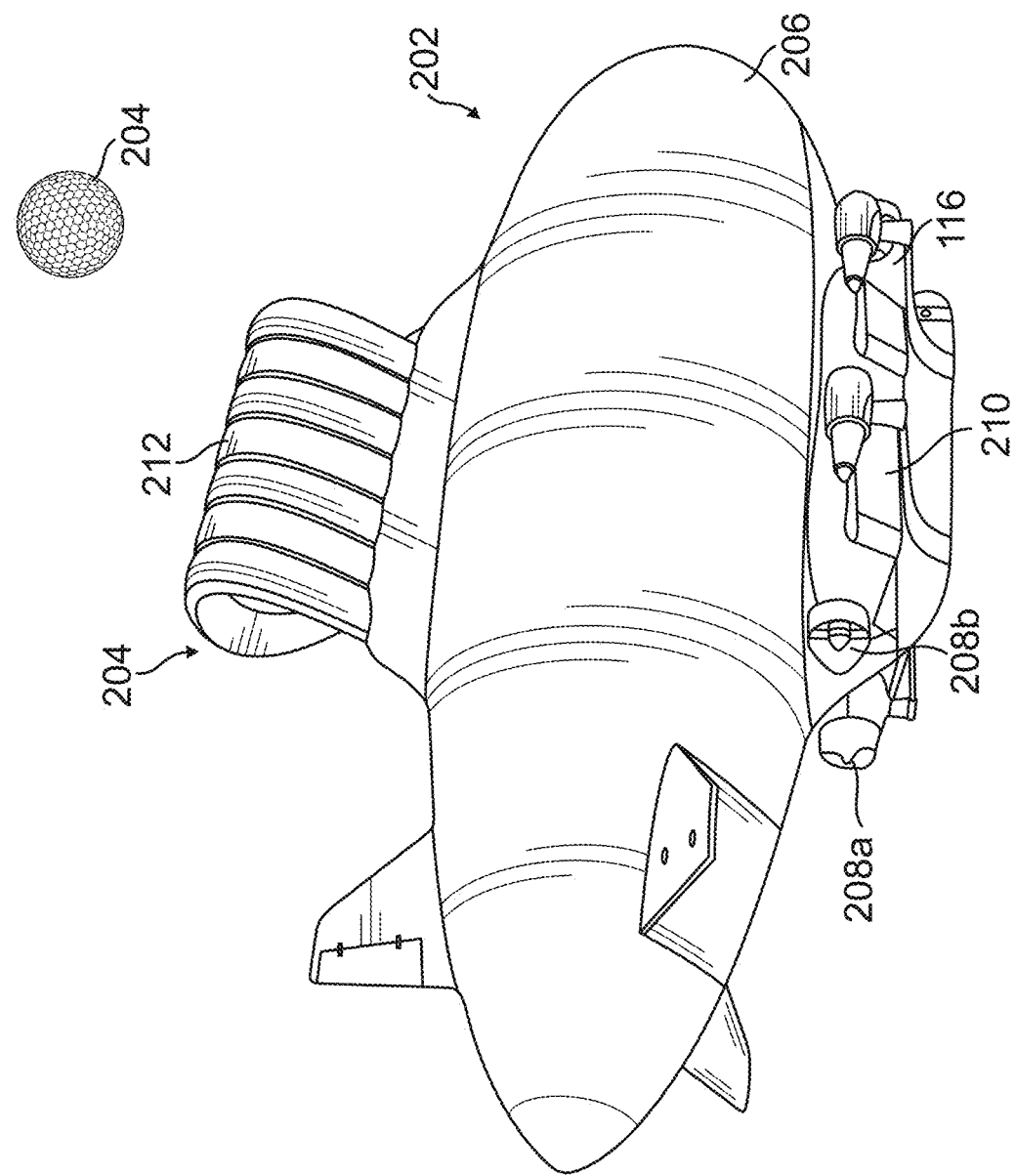
FIG. 1 is an isometric view of a launcher for a space vessel such as a cargo ball.

FIG. 1 is an elevational view of an exemplary embodiment of a launch system 204 and stratospheric aircraft 202. In one embodiment, the aircraft 202 may be a manned or unmanned airship, dirigible, blimp or other vehicle transported by a lifting gas that is lighter than air. The aircraft 202 is configured to obtain stratospheric altitudes, e.g., altitudes in a range between 12 kilometers (km) and 50 km. The aircraft 202 includes a main structure or hull 206 that holds the lifting gas (such as helium and/or hydrogen) and one or more steering propellers 208. The propellers 208 may be adjustable to provide an upward thrust to gain altitude and for maneuverability. The aircraft 202 may further include an undercarriage or capsule 210 for storage of cargo if unmanned and/or for pilots if a manned aircraft 202. In another embodiment, the aircraft 202 may include an airplane, helicopter, hovercraft, or other type of airship.

The launch system 204 is integrated with and/or implemented on and/or positioned on the aircraft 202. The launch system 204 includes an electromagnetic, superconductive guideway formed by a plurality of twisted cylinders. Superconducting magnets are spaced throughout a guideway formed in the cylinders and generate powerful magnetic fields to levitate and/or propel a cargo ball 100. The cargo ball 100 may include a ferromagnetic vessel or one whose outer shell is made of superconducting material dipped with cryogenic liquid. The magnetic fields in the guideway accelerate the cargo ball 100 through the guideway in a controlled process until the cargo ball 100 reaches a predetermined velocity, such as Mach 2.5 to Mach 5.0. An exit hatch 212 is then opened in the guideway, and the cargo ball 100 is launched from the aircraft 202 at a preconfigured flight trajectory.

In an embodiment, the predetermined velocity is a velocity sufficient for the cargo ball 100 to reach space. The escape velocity may be determined using one or more factors such as an altitude of the aircraft 202, air pressure, temperature, wind speed, trajectory of the cargo ball 100, or use of thrusters on the cargo ball 100. This escape velocity for the cargo ball 100 will be far less than for rockets or other projectiles fired from the ground because the aircraft 202 launches the cargo ball 100 from the stratosphere. For example, when the aircraft 202 is at an altitude of 40 km, only an additional 40 km to 60 km more are needed for the cargo ball 100 to reach space. In one embodiment, the cargo ball 100 may be equipped with a propulsion system, such as thrusters, to obtain additional velocity and/or for maneuvering in the stratosphere or space.

The aircraft 202 and launch system 204 may be reused for multiple missions/flights and multiple cargo balls 100 may be launched during the same mission/flight of the aircraft 202. This reuse reduces the space debris left by traditional rockets from single use rocket stages. The aircraft 202 and launch system 204 also do not release dangerous emissions into the atmosphere. The system thus decreases the environmental impact in comparison to traditional rocket launchers that emit a large amount of greenhouse gases, such as carbon dioxide and water vapor, directly into the upper atmosphere. In addition, the design of the launch system 204 on the stratospheric aircraft 202 requires less power to launch the cargo balls 100 into orbit in comparison to traditional gun rails or other known launchers positioned on the ground. The configuration of the guideway of the launch system 204 also requires less space, and so the guideway is able to fit within the confined areas of the aircraft 202.

Though the aircraft 202 is described as an airship, in other embodiments, the aircraft 202 may be an airplane configured to fly to the stratosphere. Another exemplary embodiment of the aircraft 202 is a tilt-rotor aircraft, such as Bell Boeing V-22 Osprey®, which can fly like a helicopter and an airplane. In addition, some helicopters can reach altitudes in the lower stratosphere of approximately 12 km. These or other types of aircraft 202 may be used to launch the cargo ball 100. In addition, though described as launched from the stratosphere, the cargo ball 100 may be launched from another altitude by the aircraft 202. In another embodiment, the cargo ball may be launched from the ground by the launch system 204 or by another type of launcher, such as a rail gun, pneumatic cannon, or other device. In yet another embodiment, the cargo ball 100 may be transported into space as cargo, using a rocket, space shuttle, etc.

Figure 2:
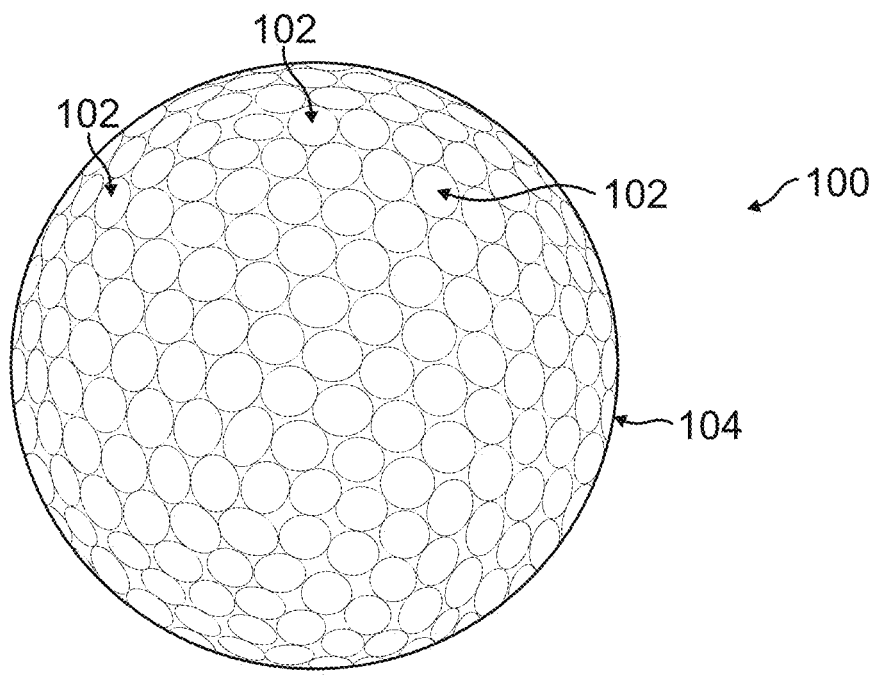
FIG. 2 is an isometric view of is an isometric view of an exemplary embodiment of a cargo ball.

FIG. 2 is an isometric view of an exemplary embodiment of the cargo ball 100. The cargo ball 100 has a spherical exterior shape that forms a plurality of dimples 102. The ferromagnetic material of the surface 104 is formed to include the small pits or dimples 102. The configuration, shape, number, and pattern of the dimples 102 may take any of a variety of different forms. For example, the dimples 102 may have a spherical circumference, hexagonal, The dimples 102 may cover an entire surface 104 of the cargo ball 100 (e.g., 90% or more), or substantially all the surface 104 (e.g., at least 60% or more), or a partially cover the surface 10 (e.g., 1% to 60%). The research that has been performed on golf balls may be applied to the dimples 102 of the cargo ball 100 with adjustments for the size of the cargo ball 100 and the characteristics of the expected environment with respect to air density and pressure. The cargo ball 100 may be driven by electromagnetic, pneumatic, or mechanical force or by a booster. Though the cargo ball 100 is shown as spherical, it may be substantially spherical, oval shaped, football shaped, spherical with a triangular portion for reducing drag, or other shape.

The dimples 102 on the cargo ball 100 may be used to create vortices and a turbulent layer that swirls about the surface of the ball decreasing the size of the wake. The dimples 102 may create a tiny layer of air around the cargo ball 100 that significantly cuts down drag. This tiny layer forces the air to flow over a larger portion of the cargo ball 100, which results in a much smoother ball flight.

These characteristics are enhanced by applying a spin to the cargo ball 100 when it is launched. Velocity, lift and distance may be increased due to the dimpled surface and/or spin of the cargo ball 100. For example, when a golf ball spins backwards, the air pressure underneath it is greater than above it, so the golf ball rises in the air. Dimples magnify this effect, contributing as much as 50% to the total lift of the golf ball. Similar to such dimpled golf balls, the dimpled cargo ball 100 may be deployed with a spin and so have a greater lift and travel farther through the stratosphere. In one example, a surface 104 of a cargo ball 100 with a 5 meter (m) diameter may include between 30,000 and 40,000 spherical dimples 102 with a depth of about 0.02 m to 0.1 m though other dimensions may be determined. In one example, the velocity necessary for such a cargo ball 100 launched from the stratosphere, e.g., at about a 40 km altitude, to reach space (e.g., 80 km to 100 km) is between Mach 2.5 to Mach 5. At this velocity, the cargo ball 100 will be able to reach space, e.g., to a 80 km to 100 km altitude. While air resistance at such altitudes is very low, at high speeds, the aerodynamic effects of the dimples 102 and/or the spin of the cargo ball 100 are still significant.

In another embodiment, the cargo ball 100 may also be launched from the ground. In one example, the cargo ball 100 may be launched from a high altitude above sea level, such as a from mountain or may be launched from polar or equatorial positions. In a ground launch from Earth, the dimples 102 on the surface of the cargo ball 100 and/or the spin of the cargo ball 100 are even more significant to generate lift. Such a ground launch requires a very high escape velocity that would cause significant friction and heat on the surface 104 of the cargo ball 100. The cargo ball 100 may be configured to endure such conditions with an increase in weight and a reduction in cargo capacity.

In another embodiment, the cargo balls 100 may be launched from the Moon, Mars, or a space docking station. Such launches from places with little to no atmosphere require a lower velocity due to thinner atmospheres. The cargo ball 100 may thus be launched into space with less force or speed from the Moon or Mars, e.g., using the launch system 204 or a rail gun, pneumatic cannon, rocket, or other device.

The velocity necessary to launch the cargo ball 100 into space is less than for a conventional rocket cylinder for several reasons. The dimples 102 on the surface 104 of the cargo ball 100 increases lift and allows the cargo ball 100 to travel a further distance, especially when a spin on the cargo ball 100 provides additional lift. When launched at about a 40 km altitude, instead of on the ground, only an additional 40 km is needed to reach space. At an 80 km to 100 km altitude, the cargo ball 100 may be configured to perform orbital maneuvers, including docking, de-spinning, deploying arms, thrusters, or connectors, etc. On a historical note, the Apollo missions performed their acrobatic maneuver called Transposition, e.g., docking, extracting, or flipping the Command and Service Module backwards to dock with the Lunar Module, at around 96 km before going to the Moon.

After the cargo ball 100 is launched, it may be captured at an intermediate destination using one or more different methods. For example, the cargo ball 100 may be configured to deploy one or more thrusters. The thrusters may be used to adjust the trajectory of the cargo ball 100, accelerate the cargo ball 100, de-spin the cargo ball 100 or maneuver to a particular point or destination.

Figure 3:
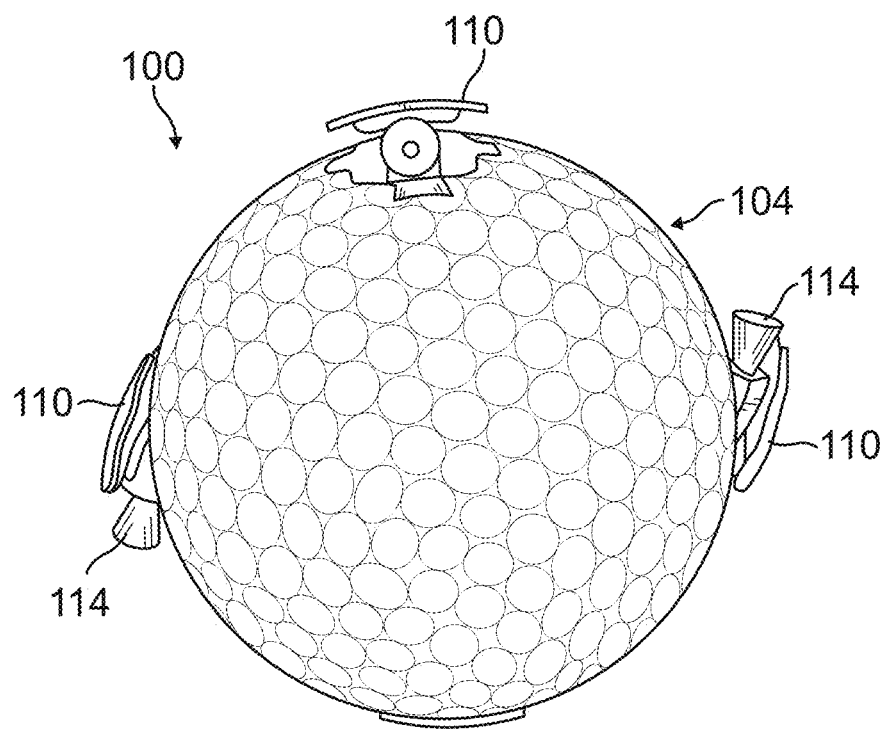
FIG. 3 is an isometric view of an exemplary cargo ball having covers as part of the exterior surface of the cargo ball and thrusters below each cover.

FIG. 3 is an isometric view of an exemplary cargo ball having one or more thrusters 114 and covers 110 of the cargo ball 100. The covers 110 have dimples the same or similar to the rest of the exterior surface 104 of the cargo ball 100. The covers 110 are pushed outwards from the center of the cargo ball 100 by suitable actuators, e.g., mechanical, electromagnetic, hydraulic, pneumatic, pyro bolts, etc. to expose thrusters 114. The thrusters 114 may be configured close to the surface of the cargo ball 100 as shown. In operation, the covers 110 are opened and the thrusters 114 are deployed from the cargo ball 100. When not needed, the thrusters 114 may be retracted back into the cargo ball 100, and the covers 110 closed. This process allows for a more compact construction within the cargo ball 100 and may be suitable for low power and intermittent use of the thrusters 114.

Figure 4:
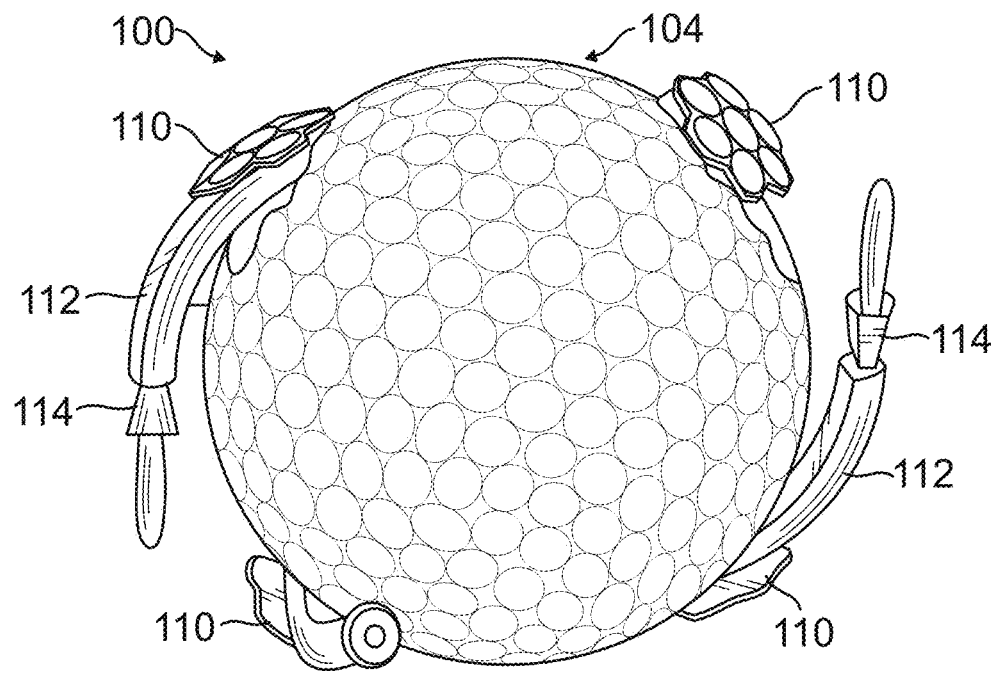
FIG. 4 is an isometric view of an exemplary cargo ball having thrusters carried on arms that extend from each cover in which the arms are configured for a spin or de-spin maneuver.

FIG. 4 is an isometric view of an exemplary cargo ball 100 having a plurality of thrusters 114 positioned within or on arms 112 that extend from within an interior of the cargo ball 100 exposed by the open covers 110. The cargo ball 100 has a set of covers 110, four in this example, which are pushed away from the surface 104 of the cargo ball 100. An arm 112 extends out from the opening revealed under the cover 110. A thruster 114 is configured at the end of each arm 112. The thruster 114 is extended away from the surface 104 of the cargo ball 100 at the end of each arm 112. In some examples the arms 112 are rotatable through some portion of a circle, e.g., 45 to 360 degrees to allow the thruster 114 to be directed in any desired direction. In one example, for a cargo ball 100 with a 5 m diameter, the arms 112 may extend between 0.5 m and 3 m.

The arms 112 allow the cargo ball 100 to maneuver, by manipulating the thrusters 114, to an orbiting rendezvous point or to a destination. In an example, a cargo ball 100 contains four equally spaced arms 112 with one maneuvering thruster arm 112 in each of four opposite quadrants of the outer surface 104 of the cargo ball 102. Before deployment, the cargo ball arms 112 are enclosed by the covers 110 that are a seamless part of the surface 104 of the cargo ball 100 with the same topical dimples and material characteristics. When the arms 112 are deployed, the covers 110 and thrusters 114 pop-out from the exterior surface 104 of the cargo ball 100 into propulsion and maneuvering positions. In some examples, the thrusters 114 have an adjustable amount of thrust and the arms 112 have the ability to swivel up to 360 degrees about a radial line from the surface 104 of the cargo ball 100. With four deployed arms 112 at multiple angles and variable thrust, the cargo ball 100 has a near unlimited number of combinations to adjust speed and to maneuver. Though four thrusters 114 and arms 112 are described, the cargo ball 100 may include one, two, three, four or more thrusters 114 and arms 112.

In a spin thrust maneuver, two or four arms 112 and thrusters 114 extend in opposite directions from opposite sides of the cargo ball 100, as shown in FIG. 3. The thrusters 114 on the two arms 112 fire to spin the ball 100 about an axis perpendicular to a line through the base of both of the thruster arms 114.

In a de-spin maneuver, the thrusters 114 are directed opposite the spin direction similar to the configuration as shown in FIG. 3 and fire counter to the spin direction.

Figure 5:
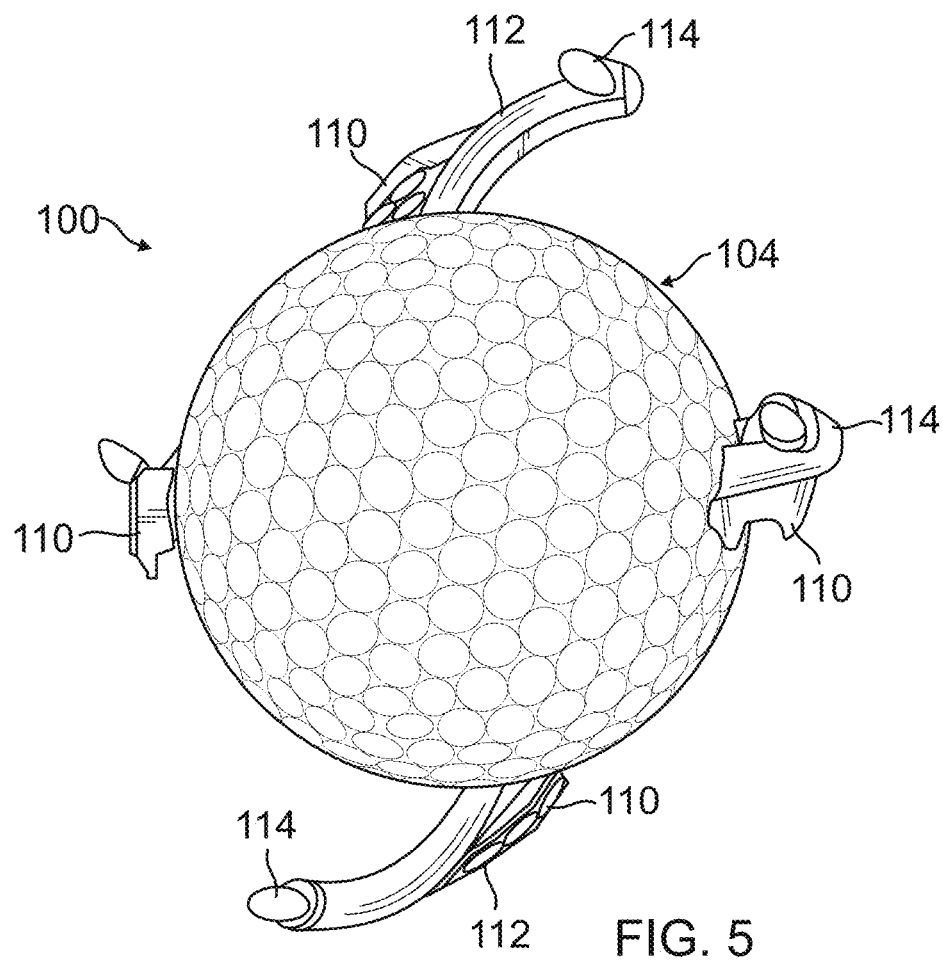
FIG. 5 is an isometric view of an exemplary cargo ball having thrusters carried on arms that extend from each cover in which the arms are configured for an acceleration maneuver.

FIG. 5 is an isometric view of an exemplary cargo ball 100 having thrusters carried on arms 112 that extend from each cover 110. In this configuration, the arms 112 are moved so that the thrusters 114 are substantially aligned or parallel and generate a force in a substantially same direction. In an acceleration maneuver, two or four thrusters 114 are aligned to point in the same direction such that the thrusters push the cargo ball 100 in one direction. The arms 112 may be moved during this maneuver for minor course corrections.

In one example, the thruster arms 112 remain deployed until the cargo ball 100 is recovered and refurbished for the next use. In another example, the thruster arms 112 may be retracted to suit later stages of the travel of the cargo ball 100.

Figure 6:
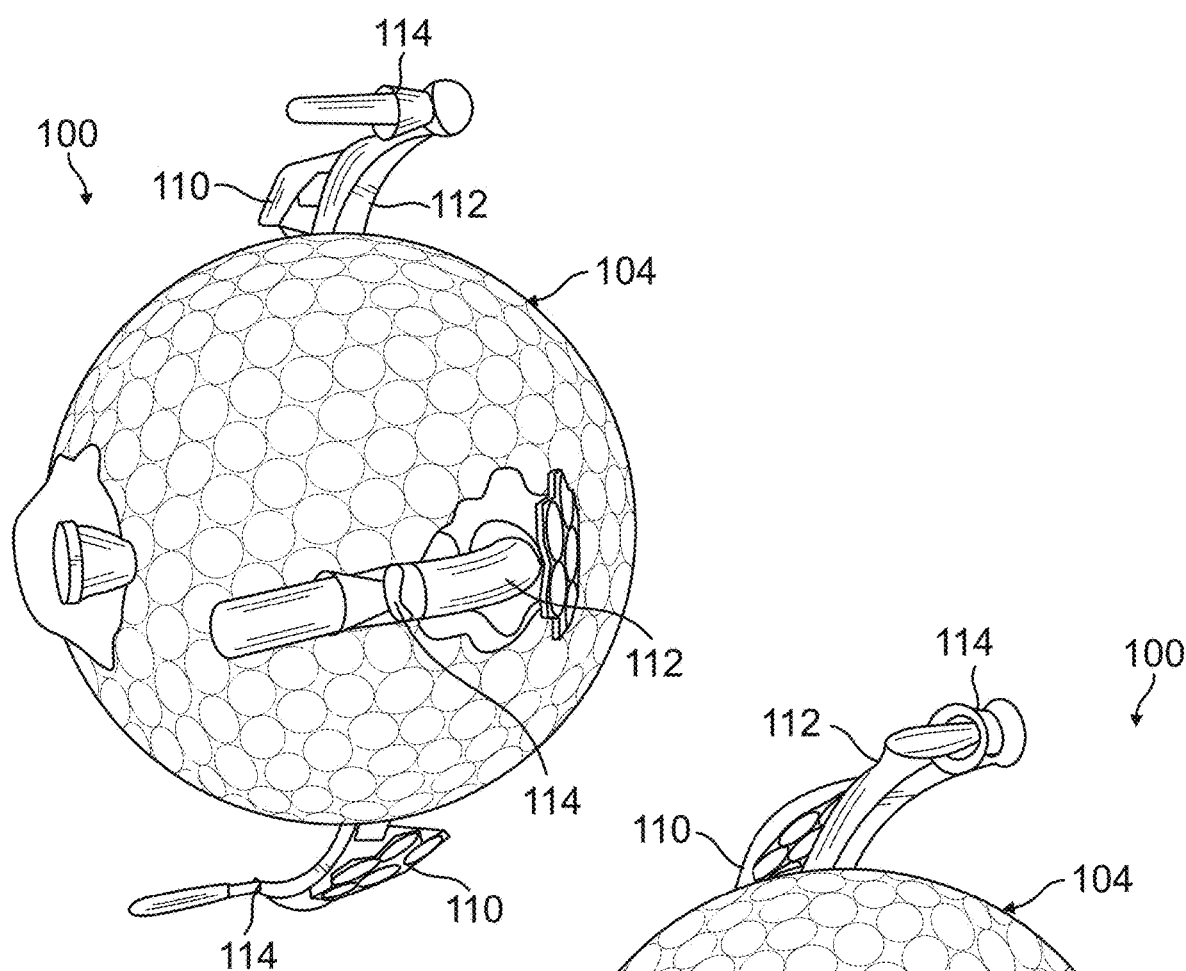
FIG. 6 is an isometric view of a cargo ball that has a cover for a main engine.
Figure 7:
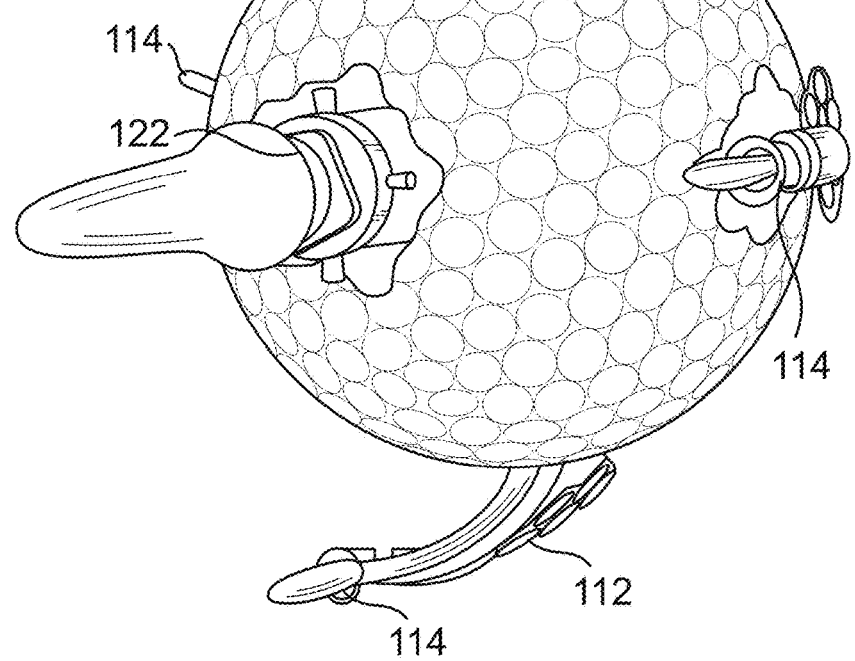
FIG. 7 is an isometric view of the cargo ball of FIG. 6 with a main engine and thrusters actuated.

FIG. 6 is an isometric view of a cargo ball 100 with a main engine 122 and a cover 120 for the main engine 122, wherein the cover 120 has just opened and revealed a nozzle of the main engine 122 as it begins to deploy. FIG. 7 is an isometric view of the cargo ball of FIG. 6 in which the cover 120 is open and the main engine 122 is fully deployed and thrusting. FIG. 7 is an isometric view of the cargo ball 100 of FIG. 6 in which the main engine 122 has been activated and all four of the thruster arms 112 are activated to provide additional thrust. The main engine 122 may be deployed alone or in combination with one or more of the thrusters 114. The thrusters 114 may also be used for course corrections or to adjust the orientation of the cargo ball 100. In an example the main engine 122 has a directional nozzle operating through mechanical, electromagnetic, or other means. The main engine 122 may be serve as a deployable large propulsion nozzle to add booster thrust. The main engine 122 may be used for the cargo ball 100 to reach higher orbits, geostationary orbits, and beyond. The available volume inside the cargo ball 100 will be reduced by the space required for fuel and equipment.

In operation, a cargo ball 100 is launched into the stratosphere or space. The cargo ball 100 may deploy the main engine 122 and/or one or more thrusters 114 to reach space. In another embodiment, the cargo ball 100 reaches space, and then the cargo ball 100 deploys one or more thruster arms 112, e.g., in this example four thruster arms, and maneuvers to a designated rendezvous location, e.g., a shipyard or base, where it may be gathered with other cargo balls 100, opened up to access the cargo, or any other suitable use may be applied to the cargo ball. The cargo ball is able to provide the building materials for a moon base: food supplies, mining equipment, reactor parts, oxygen, greenhouses, plants, water filtration, etc.

Accordingly, the cargo ball 100 operates in two or more modes. In a first mode, the cargo ball 100 has the one or more covers 110 closed and has a spherical surface 104. In this mode the cargo ball 100 is launched from a suitable mechanism with or without a spin. The cargo ball 100 then travels due to the energy applied from the launch. The cargo ball 100 has a smooth aerodynamic shape and presents a small aerodynamic drag through the atmosphere through which it is traveling. At some time after launch, the cargo ball 100 deploys thrusters 114 or a main engine 122 or both. This may be after the cargo ball 100 has cleared the atmosphere, after the momentum of the cargo ball 100 has declined, or when the cargo ball 100 is near a destination that requires maneuvers.

A cargo ball 100 may have an outer shell made from a thin ferromagnetic material that has been stamped or otherwise formed with a plurality of dimples 102. The material may be durable to be used as a building material at the destination or to survive reuse for another trip through space. In some examples, the outer shell may be made of multiple pieces held together by keyways so that the pieces may be unlocked with keys to access the cargo inside. In another example, an access port is unlocked to allow access through a tunnel to the cargo and the parts inside for refurbishment. In some examples, spherical or partial spherical building materials may be stored near the outer shell to provide a radius of curvature close to that of the outer shell. In some examples, human living quarters may be provided within the cargo ball 100 with a hatch for ingress and egress. A floor may be provided across the interior of the cargo ball 100 with room for food, environmental controls, air, and other supplies below the floor and above a ceiling.

Figure 8:
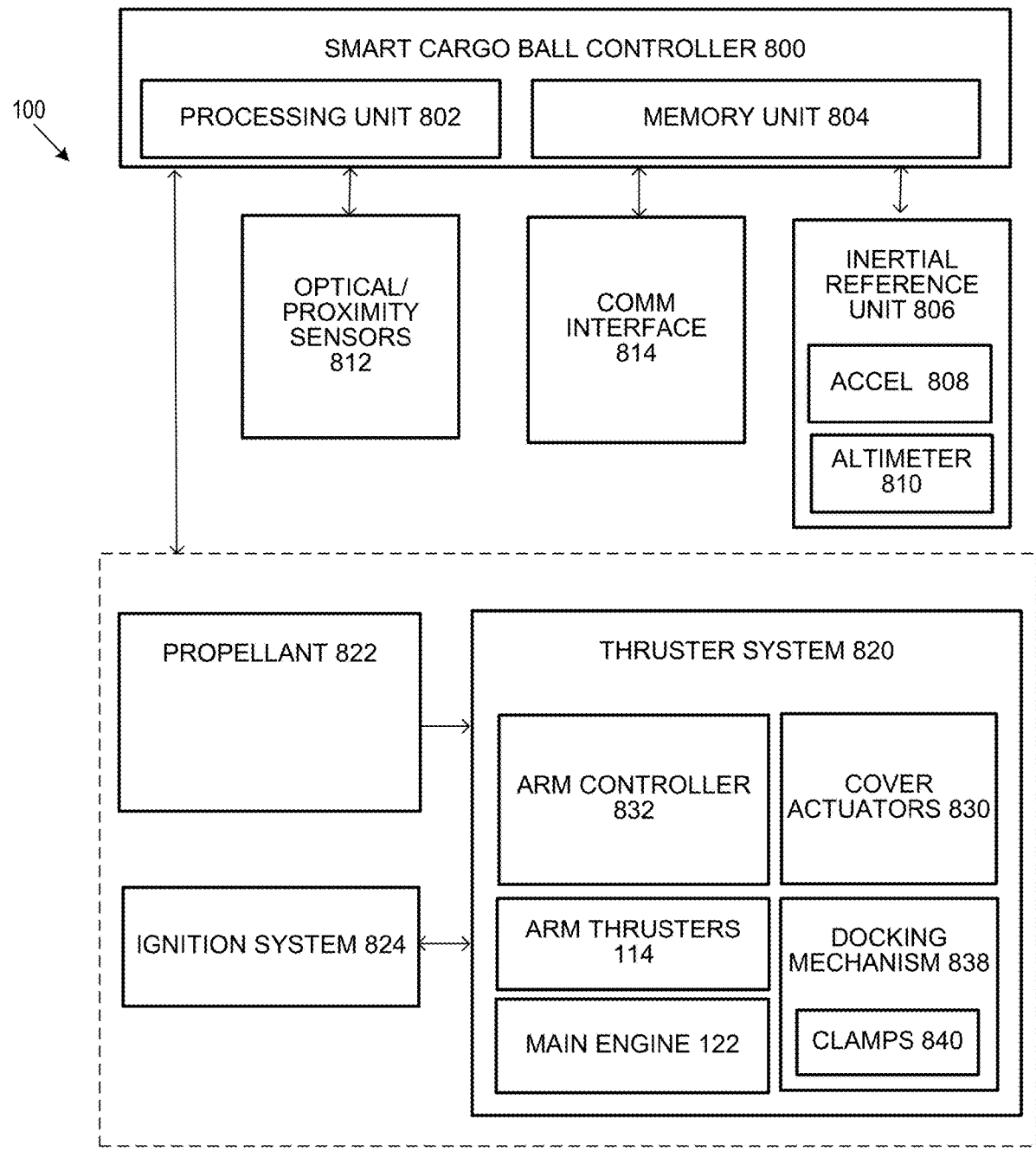
FIG. 8 is a block diagram of an exemplary embodiment of a cargo ball.

FIG. 8 is a block diagram of components of a cargo ball 100 as described herein. The cargo ball 100 has a smart cargo ball controller 800 in the form of a computing system. The controller 800 includes a processing unit 802, e.g., a microcontroller, microprocessor, field programmable gate array, or other processing unit. The controller 800 also has a memory unit 804 to store instructions and parameters for use by the processing unit 802. The controller 800 is coupled to a variety of peripheral devices suitable for the intended mission.

An inertial reference unit 806 may be provided and coupled to the controller 800 to determine the circumstances, behavior, and attitude of the cargo ball 100. The inertial reference unit may include accelerometers (Accel) 808, an altimeter 810, and other instruments or sensors including a gyroscope, barometer, gravitometer and other instruments. Optical and proximity sensors 812 e.g., cameras, laser rangefinders, lidar etc. may be coupled to the controller 800 to determine the positions and range of obstacles and targets. One or more communications interfaces (Comm Interfaces) 814 may be provided and coupled to the controller 800 to allow for remote operation or for the cargo ball 100 to report status and position among other information. A wired or near field communications interface may be configured to allow a user to set initial programming and parameter before a mission or to allow a history or log file to be extracted after a mission.

The cargo ball 100 may also include a thruster system 820 coupled to propellant 822 or fuel to power the one or more thrusters 114 and other components. An ignition system 824 may be coupled to the thruster system 820 to actuate one or more thrusters 114 of the thruster system 820. The thruster system 820 may include cover actuators 830 to open or close the one or more covers 110, an arm controller 832 to deploy, direct, and retract the one or more arms 112, one or more arm thruster 114 to maneuver the cargo ball 100, and a main engine 122. The thruster system 820 may also include a docking mechanism 838 with clamps 840 configured to enable the cargo ball 100 to be attached or attach itself to another structure at a destination. The thruster system 820 is coupled to the controller 800 to receive commands for the operation of the thruster system 820 and to report status to the controller 800.

Using the controller 800, the cargo ball 100 may be made "smart" for autonomous, or semi-autonomous operation. Alternatively, the cargo ball 100 may be controlled remotely. The cargo ball 100 may also be monitored as it sends location and status information through the communications interface 814.

Figure 9:
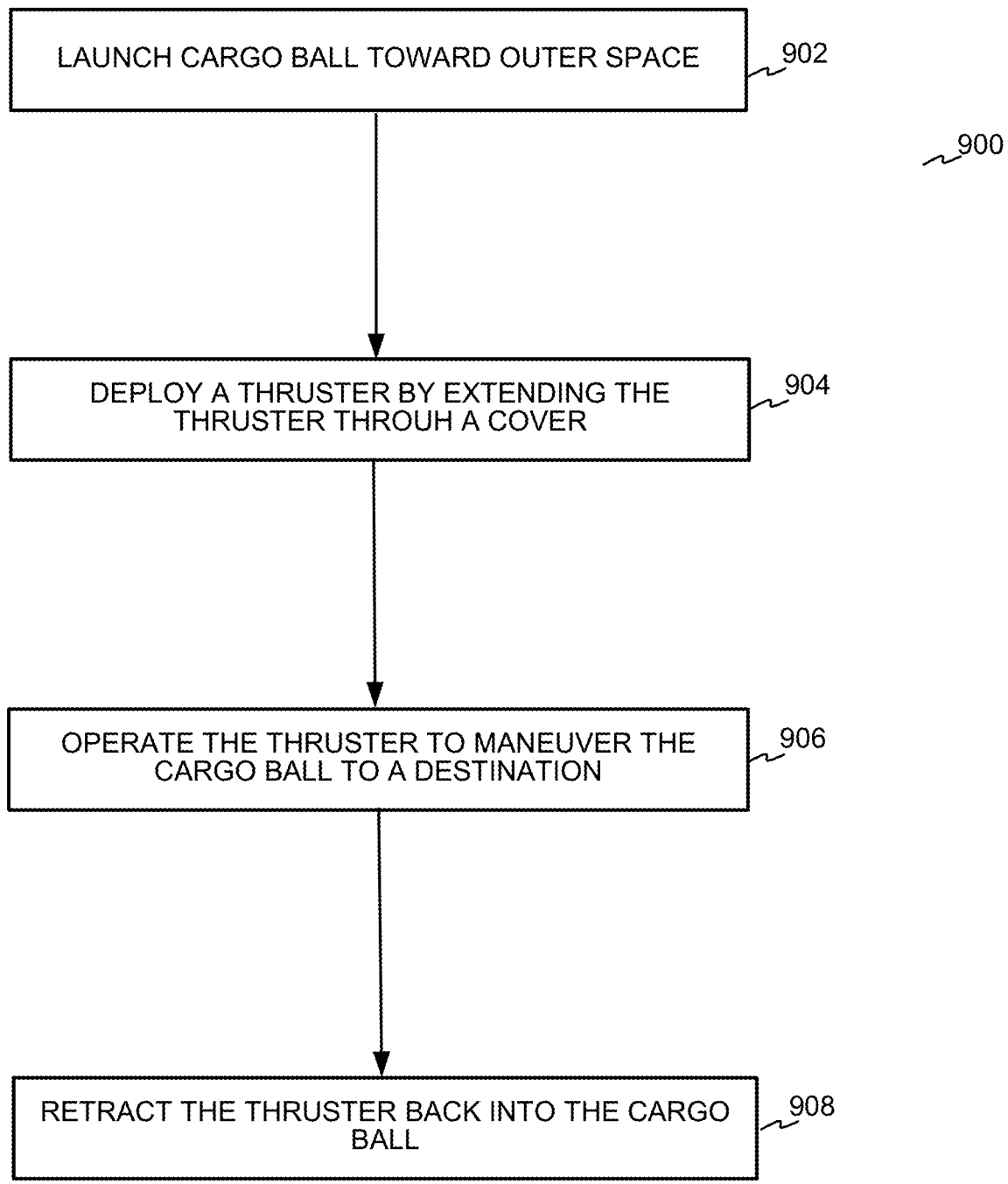
FIG. 9 is a flow diagram of an embodiment of a method for operating the cargo ball in a mission.

FIG. 9 is a process flow diagram of operating the cargo ball for a mission. At 902, a cargo ball is launched toward outer space. The cargo ball has a spherical exterior surface and a plurality of dimples in a pattern on the exterior surface. The cargo ball may be launched with a spin to increase flight length and loft. The cargo ball may be launched from Earth's upper atmosphere or from the surface of the Earth or from a spacecraft or from the surface of another world. At 904, after launching the cargo ball, a thruster is deployed by extending the thruster through a cover on a surface of the cargo ball. There may be multiple thrusters and the thrusters may be operated independently. The thruster may be deployed after leaving the upper atmosphere in response to a sensor or based on another circumstance or condition of the cargo ball.

At 906, the thruster is operated to maneuver the cargo ball to an intended destination. The thruster may be operated in different directions during operating the thruster to maneuver the cargo ball. In one example maneuvering the cargo ball comprises de-spinning the cargo ball. At 908, the thruster is retracted back into the cargo ball.

As may be used herein, the term "operable to" or "configurable to" indicates that an element includes one or more of components, dimensions, circuits, instructions, modules, data, input(s), output(s), etc., to perform one or more of the described or necessary corresponding functions and may further include inferred coupling to one or more other items to perform the described or necessary corresponding functions. As may also be used herein, the term(s) "coupled," "coupled to," "connected to" and/or "connecting" or "interconnecting" includes direct connection or indirect connection through one or more other intervening components. As may further be used herein, inferred connections (i.e., where one element is connected to another element by inference) includes direct and indirect connection between two items in the same manner as "connected to." As may be used herein, the terms "substantially" and "approximately" provide an industry-accepted tolerance for its corresponding term and/or relativity between items.

Note that the aspects of the present disclosure may be described herein as a process that is depicted as a schematic, a flow chart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

The various features of the disclosure described herein can be implemented in different systems and devices without departing from the disclosure. It should be noted that the foregoing aspects of the disclosure are merely examples and are not to be construed as limiting the disclosure. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

In the foregoing specification, certain representative aspects have been described with reference to specific examples. Various modifications and changes may be made, however, without departing from the scope of the present invention as set forth in the claims. The specification and figures are illustrative, rather than restrictive, and modifications are intended to be included within the scope of the claims. Accordingly, the scope of the claims should be determined by the descriptions herein and their legal equivalents rather than by merely the examples described. For example, the components and/or elements recited in any apparatus claims may be assembled or otherwise operationally configured in a variety of permutations and are accordingly not limited to the specific configuration recited in the claims.

Furthermore, certain benefits, other advantages and solutions to problems have been described above with regard to particular embodiments; however, any benefit, advantage, solution to a problem, or any element that may cause any particular benefit, advantage, or solution to occur or to become more pronounced are not to be construed as critical, required, or essential features or components of any or all the claims.

As used herein, the terms "comprise," "comprises," "comprising," "having," "including," "includes" or any variation thereof, are intended to reference a nonexclusive inclusion, such that a process, method, article, composition or apparatus that comprises a list of elements does not include only those elements recited, but may also include other elements not expressly listed or inherent to such process, method, article, composition, or apparatus. Other combinations and/or modifications of the above-described structures, arrangements, applications, proportions, elements, materials, or components used in the practice of the present invention, in addition to those not specifically recited, may be varied, or otherwise particularly adapted to specific environments, manufacturing specifications, design parameters, or other operating requirements without departing from the general principles of the same.

Moreover, reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is intended to be construed under the provisions of 35 U.S.C. § 112(f) as a "means-plus-function" type element, unless the element is expressly recited using the phrase "means for" or, in the case of a method claim, the element is recited using the phrase "step for."

The invention claimed is:

1. A cargo ball comprising:
   a single spherical structure with a spherical exterior surface that spins in a plurality of directions;
   a plurality of dimples in a pattern on substantially all of the spherical exterior surface;
   at least a first curved cover shaped to lay flush and/or seamless with the spherical exterior surface in an undeployed state and configured to open in a deployed state; and
   at least a first thruster inside the single spherical structure and under the first curved cover in the undeployed state, wherein the at least first thruster is configured to be deployed through the at least first curved cover to an outside position from the cargo ball in the deployed state.

2. The cargo ball of claim 1, further comprising at least one arm attached to the thruster, wherein the at least one arm extends through the at least first curved cover to an outside position from the cargo ball, wherein the thruster is at the end of the arm.

3. The cargo ball of claim 2, wherein the arm is rotatable through some portion of a circle to allow the thruster to be directed in different directions.

4. The cargo ball of claim 2, further comprising four arms extending from the cargo ball in each of four opposite quadrants of the outer surface of the cargo ball.

5. The cargo ball of claim 1, further comprising:
   a main engine cover shaped to lay flush and/or seamless with the spherical exterior surface in the undeployed state and includes the plurality of dimples; and
   a main engine positioned inside the cargo ball in the undeployed state, wherein a nozzle of the main engine is exposed when the main engine cover is opened and the main engine is deployed to provide thrust to the cargo ball.

6. The cargo ball of claim 1, further comprising an outer shell made from a thin ferromagnetic material or superconducting material.

7. A method comprising:
   launching a cargo ball toward outer space with the cargo ball spinning, wherein the cargo ball has a spherical structure having a spherical exterior surface and a plurality of dimples in a pattern on the exterior surface;
   during launch, positioning at least one thruster in an undeployed state inside the single spherical structure under a curved cover, wherein the curved cover is shaped to lay flush and/or seamless with the spherical exterior surface of the cargo ball;
   after launching the cargo ball, deploying the thruster by opening the curved cover and extending the thruster through the curved cover to an external position outside of the spherical exterior surface of the cargo ball;
   operating the thruster to stop the cargo ball spinning and to maneuver the cargo ball to an intended destination; and
   returning the thruster to an undeployed state by retracting the thruster inside the single spherical structure of the cargo ball and closing the curved cover to lay flush and/or seamless with the spherical exterior surface.

8. The method of claim 7, further comprising directing the thruster in different directions during operation of the thruster to maneuver the cargo ball.

9. The method of claim 8, wherein launching the cargo ball comprises launching the cargo ball with a spin and maneuvering with spin thrust or wherein maneuvering the cargo ball comprises de-spinning the cargo ball.

10. The method of claim 8, wherein launching the cargo ball comprises launching the cargo ball from an upper atmosphere and wherein deploying the thruster comprises deploying the thruster after leaving the upper atmosphere or entering space.

11. The cargo ball of claim 1, wherein the plurality of dimples on substantially all of the spherical exterior surface means the plurality of dimples are on 60% or more of the exterior surface.

* * * * *